(12) United States Patent
Herrera et al.

(10) Patent No.: US 8,390,305 B2
(45) Date of Patent: Mar. 5, 2013

(54) METHODS OF DETERMINING MID-STROKE POSITIONS OF ACTIVE MATERIAL ACTUATED LOADS

(75) Inventors: Guillermo A. Herrera, Winnetka, CA (US); Xiujie Gao, Troy, MI (US); Nancy L. Johnson, Northville, MI (US); Alan L. Browne, Grosse Pointe, MI (US); Christopher P. Henry, Thousand Oaks, CA (US); Andrew C. Keefe, Encino, CA (US); Geoffrey P. McKnight, Los Angeles, CA (US); Sloan Smith, Calabasas, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 185 days.

(21) Appl. No.: 13/046,748

(22) Filed: Mar. 13, 2011

(65) Prior Publication Data

US 2011/0163769 A1 Jul. 7, 2011

Related U.S. Application Data

(63) Continuation-in-part of application No. 12/437,722, filed on May 8, 2009, now Pat. No. 8,188,757.

(51) Int. Cl.
*G01R 27/08* (2006.01)
(52) U.S. Cl. .................................... 324/691; 324/76.11
(58) Field of Classification Search .................. 324/691, 324/76.11
See application file for complete search history.

(56) References Cited

U.S. PATENT DOCUMENTS

2005/0146408 A1* 7/2005 Traversa et al. ............... 335/220

* cited by examiner

*Primary Examiner* — Vincent Q Nguyen (57) ABSTRACT

Systems for and methods of determining at least one mid-stroke position of an active material actuated load by causing a stress induced rapid change in electrical resistance within the active material element, or modifying an ancillary circuit, when the load is at the mid-stroke position(s).

20 Claims, 3 Drawing Sheets

FIG. 9

METHODS OF DETERMINING MID-STROKE POSITIONS OF ACTIVE MATERIAL ACTUATED LOADS

CROSS REFERENCE TO RELATED APPLICATIONS

The present patent application continues in part from U.S. patent application Ser. No. 12/437,722, entitled "METHOD OF CONTROLLING A SHAPE MEMORY ALLOY ACTUATOR UTILIZING RESISTANCE CHANGE," filed on May 8, 2009 now U.S. Pat. No. 8,188,757, the disclosure of which is incorporated by reference herein.

BACKGROUND OF THE INVENTION

1. Field of the Invention

The present invention relates generally to methods of determining a mid-stroke position of an active material actuated load, and more particularly, to methods of determining the mid-stroke position by inducing a change in electrical resistance in the actuator through a change in the mechanical resistance to motion or otherwise modifying a circuit, correlative to the position during the stroke.

2. Discussion of the Prior Art

Active material actuators are used in a variety of applications to translate a load between first and second generally predetermined positions corresponding to the available strain or shape memory of the material, so as to define a "stroke." In many instances, however, determining at least one mid-stroke position is also beneficial and desirous. For example, where translating a load between first and second stages of an assembly process, it may be desirous to detect when the load is midway between stages, so as to pre-initiate the second stage of the process. Conventional methods of determining mid-stroke positions of translated loads, generally include various types of position sensors and other external devices that are configured to track and/or selectively engage the load. These methods present various concerns in the art, including added mechanical complexity, higher cost, greater packing requirements, increased weight, and more components, especially where the load is large and/or cumbersome.

BRIEF SUMMARY OF THE INVENTION

Responsive to these and other concerns, the present invention recites novel methods of determining mid-stroke positions of an active material actuated load or device. The invention is useful for creating a change in electrical resistance within the material or otherwise modifying an ancillary circuit, at the mid-stroke position, so as to determine the position. The invention is useful for presenting a mid-stroke determining system that reduces the mechanical complexity, costs, packaging requirements, weight, and number of potential failure points, in comparison to prior art position determining sensors. The invention provides methods of varying the mid-stroke positions determinable, including methods of varying the locations and plurality of determinable positions. Finally, where coupled with dynamic holds or other holding mechanisms, the invention is useful for presenting a multi-position actuator that replaces for example actuators having multiple active material elements configured to provide multiple discrete displacements.

In a first aspect, the invention concerns a resistance-based method of determining a mid-stroke position of a load driven by an active material element. The element is operable to undergo a reversible change in fundamental property when exposed to or occluded from an activation signal, so as to be activated and deactivated respectively, and is operable to translate the load between first and second positions as a result of the change, thus defining a stroke. The method comprises activating or deactivating an element and monitoring the inherent electrical resistance within the element. When the load is at the mid-stroke position, a stress in the active material element is induced or reduced, so as to cause an increase or decrease in the electrical resistance correlated with the load being in a known mid-stroke position. The increase or decrease in resistance is correlated with the mid-stroke position, so as to determine the position.

In a second aspect, the invention concerns a circuit-based method of determining at least one mid-stroke position of a load driven by an active material element operable to undergo a reversible change in fundamental property when exposed to or occluded from an activation signal, and the element translates the load from between first and second positions as a result of the change, so as to define a stroke having a path. Next, an ancillary circuit is positioned relative to the path and the element is exposed to or occluded from the activation signal, so as to cause the change and translate the load. The circuit engages the load at said at least one mid-stroke position and the circuit is modified as a result of the engagement. Lastly, the modification is determined, so as to identify said at least one mid-stroke position of the load.

Further aspects of the invention include affecting (e.g., inducing or reducing) the stress in the active material element with mechanical or magnetic engagement, and modifying the circuit by selectively engaging switches, photo-interrupters, and photo-transistors. These methods are further described and exemplified by the following figures and detailed description.

BRIEF DESCRIPTION OF THE SEVERAL VIEWS OF THE DRAWING

A preferred embodiment(s) of the invention is described in detail below with reference to the attached drawing figures of exemplary scale, wherein.

DETAILED DESCRIPTION OF THE PREFERRED EMBODIMENTS

Referring to FIGS. 1-9, the present invention concerns an active material actuated system 10 configured to determine, and a method of determining, at least one mid-stroke position of a load 12 drivenly coupled thereto, wherein the "stroke" is defined by the system 10, and the term "mid-stroke position" is defined as any point between the beginning and end of the stroke. The invention is particularly suited for expanding the use of traditional two position active material actuated devices, such as, for example, an active material actuated automotive air vent. More particularly, in an air-vent application, the invention may be used to achieve precise position control between fully opened and fully closed positions, by informing the control apparatus, when the vent is at one or more mid-stroke positions. In general, the inventive system 10 accomplishes the intended function by causing a distinctively rapid change in electrical resistance within a constituent active material element 14, or by modifying an ancillary circuit 16 through interaction with the load 12. The embodiments described and illustrated herein are exemplary in nature; it is appreciated that other applications, configurations, and uses may be readily determined by those of ordinary skill in the art.

I. Active Material Discussion

As used herein, the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Suitable active materials for use with the present invention include but are not limited to shape memory alloys, shape memory polymers, electroactive polymers ("EAP"), piezoelectric composites, magnetostrictives, magnetorheological fluids, electrorheological fluids, and other equivalent active materials. Depending on the particular active material, the activation signal can take the form of, without limitation, an electric current, an electric field (voltage), a temperature change, a magnetic field, and the like.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or Martensite phase, shape memory alloys can be pseudo-plastically deformed and upon exposure to some higher temperature will transform to an Austenite phase, or parent phase, returning to their shape prior to the deformation.

Shape memory alloys exist in several different temperature-dependent phases. The most commonly utilized of these phases are the so-called Martensite and Austenite phases discussed above. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the Martensite phase to the Austenite phase, as well as an additional shape transition upon cooling from the Austenite phase back to the Martensite phase. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the actuator with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change (recovery of pseudo-plastic deformation induced when in the Martensitic phase) of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the actuator electronically controllable.

Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material at the transition temperature of the soft segment followed by cooling to fix the shape. The material can be reverted back to the permanent shape by heating the material above the transition temperature of the soft segment. For example, the permanent shape of the polymeric material may present a spring or monolithic body having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require continuous power to remain in their lower modulus state.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

II. Exemplary Configurations and Applications

Figure 1A:
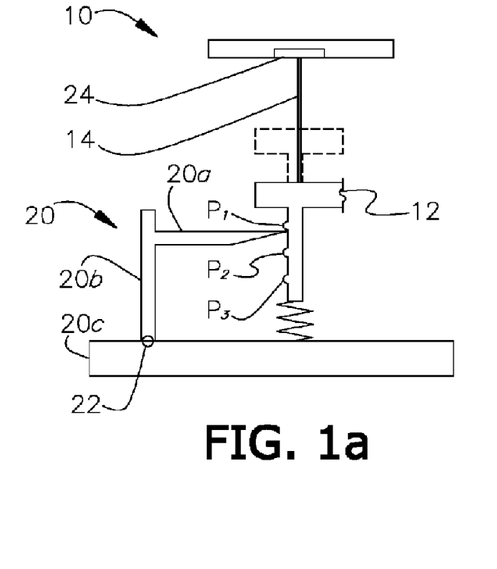
FIG. 1a is a schematic elevation of an actuation system, including an active material element in the geometric form of a wire, a portion of a load drivenly coupled with the wire and defining multiple protrusions, and a member resistively engaging the second protrusion, in accordance with a preferred embodiment of the invention.
Figure 1B:
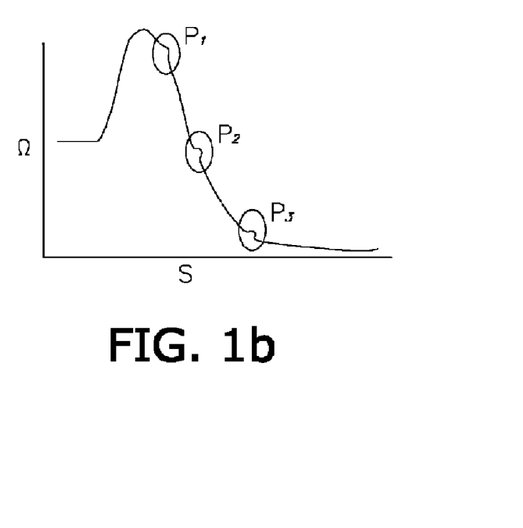
FIG. 1b is a graph of electrical resistance of the active material element shown in FIG. 1a during a stroke, wherein the rapid changes in resistance caused by the member engaging the protrusions are circled.

In a first aspect of the invention, a schematic elevation of a preferred embodiment of an actuation system 10 is shown in FIGS. 1a and 1b, wherein at least a portion of a load 12 is drivenly coupled to an active material element 14, and the system 10 is configured to determine mid-stroke positioning by producing a rapid change in the electrical resistance of the element 14. As such, it is appreciated that the preferred element 14 is of the type electrically activated by passing a current therethrough (e.g., SMA), so that the same signal that is used for activation may be used to effect the intended functions of the invention. As shown in hidden line-type in FIG. 1, when the element 14 is activated, the load 12 is caused to translate between first and second positions along a path, so as to define the stroke. In the first aspect of the invention, the element 14 is configured to directly drive the load 12; in the second aspect, however, the system 10 may further utilize stored energy to drive the load 12.

Figure 2:
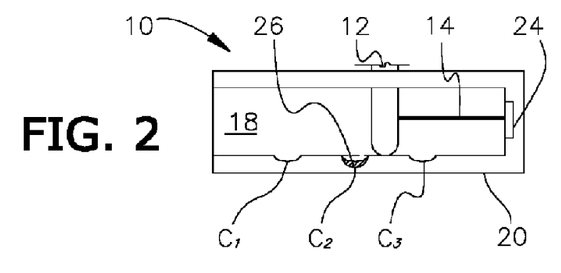
FIG. 2 is a schematic elevation of an actuation system, including an active material element, a portion of a load drivenly coupled with the element and engaging a surface defining a plurality of detents, in accordance with a preferred embodiment of the invention.

It is appreciated that the portion of the load 12 is preferably a dedicated structure that is fixedly coupled to the main load (not shown) and used primarily for determining mid-stroke position as taught by the present invention. By engaging only the dedicated portion, the present invention reduces the scale of operation in comparison to prior art position sensing devices that engage the entire load (e.g., a vehicle chassis, workstation pallet, bins, etc.). A preferred portion may be a miniature cylinder, plug, O-ring clip, fastener, or the like coupled to, so as to translate congruently with, the main load. In a preferred embodiment, the portion of the load 12 presents a diameter or lateral dimension not greater than thrice the diameter of the element 14, so as to be packaged within a self-sustained environment, e.g., within the same track 18 of a conveyor entraining the element 14 (FIG. 2).

In a first embodiment, the load 12 is configured to physically engage a fixed external member 20 at the mid-stroke position, such that a rapid change in electrical resistance is produced (FIGS. 1-5). More specifically, the load 12 is configured to resistively catch the member 20 as it passes by the mid-stroke position(s), so as to induce (or reduce) a spike in stress within the element 14 that, in turn, produces the rapid change in resistance. The rapid change in resistance is detected or determined formulaically, and then subsequently used to convey to a user that the load 12 has achieved the mid-stroke position(s), as further described below.

In the example shown in FIG. 1, the load 12 defines a plurality of protrusions (shown in FIG. 1 as three, P1-3), and the external member 20 presents a cantilever comprising an extended arm 20a, and a wall 20b stemming from a base 20c. The protrusions P1-3 are positioned and configured to engage, but resistively pass by, the distal end of the arm 20a, when the load 12 is at mid-stroke positions corresponding thereto. To that end, the protrusions P1-3 preferably present rounded or tapered leading edges. The arm 20a preferably define a tapered edge as well, so as to facilitate engagement; and the cantilever 20 may be configured to resistively flex, bend, or give at one or more of the arm 20a, wall 20b, or connection point between the wall 20b and base 20c. For example, a suitably selected hinge 22 may be disposed along the connection point. Alternatively, it is appreciated that the load 12, and therefore protrusions P1-3, may be configured to laterally translate as they pass by. In another alternative, both the load 12 and cantilever 20 are configured to laterally give and translate.

In the preferred embodiment, the element 14 comprises one or more SMA wires, wherein the term "wire" shall be deemed to include other tensile load carrying geometric configurations, such as cables, braids, ropes, weaves, bundles, and the like. Upon activation, it is appreciated by those of ordinary skill in the art that SMA wire if pre-strained decreases in length and increases in cross-sectional area (i.e. recovers its pre-strain dimensions), which causes the load 12 to translate and an underlying tensile stress to be experienced by the wire 12.

In a preferred embodiment, the element 14 is communicatively coupled with a controller (or other device) 24 operable to measure the electrical resistance of the element 14 throughout the stroke. An exemplary graph of the electrical resistance of an SMA wire 14 versus time during a stroke is shown in FIG. 1b. It is appreciated that various factors intrinsic to the wire 14 will affect the electrical resistance measured by the controller 24. One factor is the change in wire dimensions caused by activation, where it is further appreciated that electrical resistance is directly proportional to length, and inversely proportional to cross-sectional area. Thus, in the illustrated embodiment, reducing the length and increasing the cross-sectional area of the SMA wire 14 due to activation results in an overall decrease in electrical resistance as observed from transformation, represented by the peak in FIG. 1b. The electrical resistance of the wire 14 is also affected by the amount of stress being experienced, and the resultant elastic deformation. Lastly, the thermal hysteresis associated with the phase change in the wire 14 also affects the measured electrical resistance.

When the fixed member 20 engages one of the protrusions P1-3, the tensile stress experienced by the loaded wire 14 increases, and acts in opposition to the contraction caused by the activation. The change in stress creates a rapid change in the electrical resistance that is not affected by the hysteresis of the activation. The rapid changes are reflected as a "bump" on the curve in FIG. 1b, and are correlated with the mid-stroke positions. It is appreciated that the geometric configuration and positioning of the protrusions P1-3, and/or the duration of the engagement may be manipulated as needed to allow the rapid change in electrical resistance to be determined more facilely by the controller 24.

In a preferred embodiment, the controller 24 is operable to manipulate the activation signal in response to the rapid change in electrical resistance, for example, to cause the load 12 to maintain at least one mid-stroke position; and as such, preferably presents a closed loop feedback system 10. More particularly, manipulation may include intermittently reversing the activation signal, so as to repetitively toggle activating and deactivating the element 14. That is to say, when the electrical resistance indicates that the load 12 is no longer in the mid-stroke position, the controller 24 restores the signal generated by the signal source (not shown), which causes the fundamental change in property, until the load 12 is again at the mid-stroke position. This cycle of activating and deactivating the element 14 can continue for as long as desired. Alternatively, the system 10 may be configured to maintain mid-stroke positioning through mechanical means; for example, a ratchet (not shown) may be included to selectively return the load 12 to the first position, when the element 14 is deactivated. Moreover, and as shown in FIG. 1, the protrusions P1-3 and/or member 20 may be configured so as to present a tapered surface that promotes sliding disengagement only in one direction.

An opposite example is shown in FIG. 2, wherein a portion of a load 12 is drivenly coupled to an active material element 14, and caused to slidably engage an external member 20 defining a surface. The surface defines a plurality of midstroke detents or cavities (shown in FIG. 2 as three, C1-3) that mechanically resistively catch the load 12 as it slides by. When the load 12 translates across one of the cavities C1-3, the stress in the element 14 is increased, causing a rapid change in the electrical resistance of the element, and a corresponding mid-stroke position of the load 12 to be determined. It is appreciated that in operation, the system 10 may be calibrated by first activating the element 14 and translating the load 12 from first to second cavities C1-3 to establish the relationship between the activation signal and the rate of change in electrical resistance. After the relationship is established, the strength or duration of the activation signal can be adjusted to increase or decrease the power usage, and/or compensate for environmental interference.

In a preferred embodiment, a second active material element 26 may be disposed within or incorporated so as to otherwise define the slidably engaged surface, such that the cavities C1-3 are selectively variable (FIG. 2). More particularly, the member 20 may be formed at least in part by the second active material element 26, or include an overlay (not shown) consisting essentially of the element 26, and the second element 26 enables the depth of one or more of the cavities C1-3 to be selectively increased, decreased, or eliminated altogether. It is appreciated that any modification of the depth will vary the stress induced thereby, and therefore alter the rapid change in electrical resistance. More preferably, differing pluralities of cavities C1-3 may be caused to disappear, when it is no longer desired to determine their corresponding mid-stroke positions, by utilizing and activating a second element 26 operable to recover a shape resultant in a flush surface with the member 20. A suitable second active material 26 for the intended use is a shape memory polymer—an active material able to recover shape memory when in planar form. Alternatively, the modifiable cavities C1-3 can also be achieved by using a magnetorheological and/or electrorheological fluid, or damper.

Figure 3A:
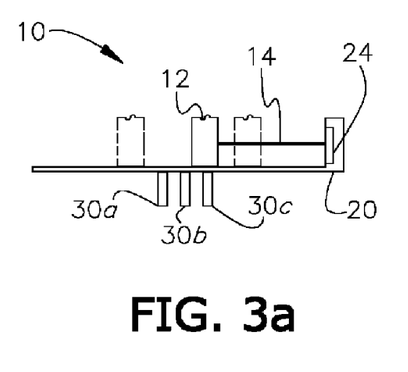
FIG. 3a is a schematic elevation of an actuation system, including an active material element, a portion of a load drivenly coupled with the element, an external member defining a friction surface adjacent the portion, and a series of magnets or ferrous objects positioned adjacent the surface, in accordance with a preferred embodiment of the invention.
Figure 3B:
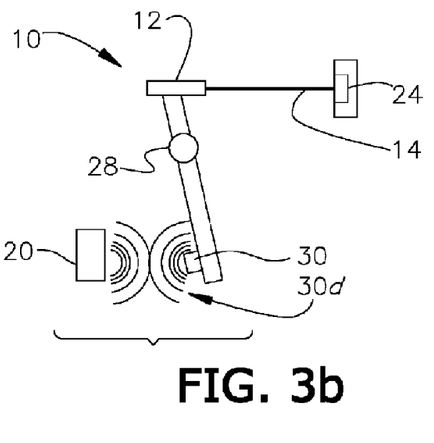
FIG. 3b is a schematic elevation of an actuation system, including an active material element, a portion of a load drivenly coupled with the element and connected to a first end of a fulcrum, wherein the fulcrum presents a first magnet at the opposite end, and a second magnet or ferrous material is positioned so as to selectively engage or disengage the first magnet, in accordance with a preferred embodiment of the invention.

A preferred embodiment of the system 10 is shown in FIGS. 3a and 3b, wherein a portion of a load 12 is drivenly coupled with an active material element 14, and the system 10 is configured to use magnetism to effect the change in stress and therefore electrical resistance. That is to say, the load is caused to engage a magnetic field at the mid-stroke position, which in turn, effects a force upon the element 14. For example, a series of elongated magnets 30a-c may be off-centered along and orthogonally oriented relative to the path, so that they each exert an attractive magnetic force upon a ferrous part of the portion of the load 12 as it passes by. As such, the magnets 30a-c individually cause an increase in stress, e.g., further by causing the portion 12 to frictionally engage an external member 20, and therefore a rapid change in electrical resistance within the element 14 (FIG. 3a).

In a further embodiment, and as shown in FIG. 3b, the load 12 may be connected to the first end of a fulcrum 28, where packaging necessitates. It is appreciated that other simple machines, such as pulleys, friction wheels, and the like may be used in the system 10 to redirect the motion of the translation, increase the force or distance of the stroke, or otherwise mechanically amplify the stress. More particularly, the fulcrum 28 may be ferrous or present a magnet 30 at the end opposite the load 12. The fixed member 20, in this configuration, correspondingly presents magnetic or ferrous material based upon the fulcrum 28. As the load 12 is caused to translate to the mid-stroke position it will reach a point wherein the field 30d acts upon the opposite material; at this point the element 14 experiences a spike or reduction in stress, and a rapid change in electrical resistance occurs. As the magnet 30 moves closer to the opposite material, the magnetic field 30d becomes stronger. It is appreciated that the magnet 30 may be configured such that the magnetic field either attracts, so as to reduce the tensile stress experienced by the element 14 by reducing the mechanical resistance to motion, and through reducing the tensile stress, reducing the electrical resistance in the actuator material, or repels, so as to induce a greater tensile stress and accordingly increase the electrical resistance in the element 14. Again, the controller 24 detects the rapid change in electrical resistance caused by the magnet 30 and determines the mid-stroke position of the load 12 based thereupon.

It is further appreciated that either or both of the fulcrum 28 and member 20 may be magnetized, and/or present a paramagnet (i.e., a material that emits no magnetic field of its own but responds in the presence of a magnetic field), a ferromagnet (i.e., a material that responds in the presence of a magnetic field and emits its own magnetic field after the first field is removed), or a non-permanent magnet, such as an electromagnet. Where an electromagnet is utilized, the fulcrum 28 is preferably further coupled to a switch (not shown) and is configured to activate the electromagnet by toggling the switch, when at or near an upcoming mid-stroke position.

Figure 4:
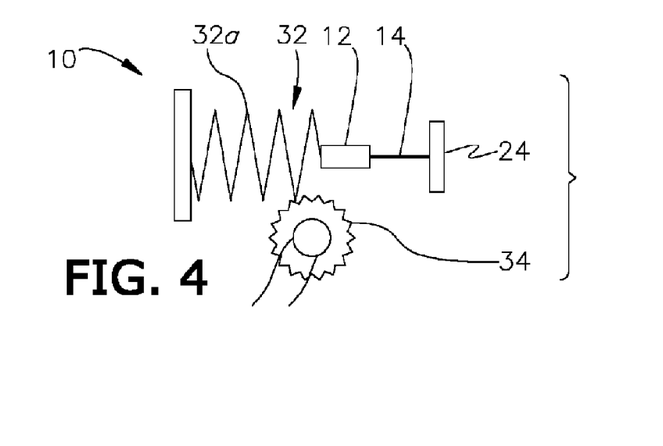
FIG. 4 is a schematic elevation of an actuation system, including an active material element drivenly coupled with a load, a coil spring connected to the load opposite the element, and a resistance wheel positioned so as to selectively engage the coil spring, in accordance with a preferred embodiment of the invention.

In the preferred embodiment of the system 10 shown in FIG. 4, a portion of a load 12 is drivenly coupled with an active material element 14, and oppositely to a spring 32. Again, the element 14 is communicatively coupled with a controller 24 operable to measure the electrical resistance of the element 14 over time. The system 10 functions to selectively modify the damping coefficient of the spring 32 with respect to the driven load 12 by engaging a mechanical resistance mechanism (e.g., a mechanically resistive rotating wheel) 34 at the mid-stroke position. More preferably, each coil 32a of the spring 32 is caused to engage the mechanism 34, so as to determine a plurality of mid-stroke positions. That is to say, each time a coil 32 engages the wheel 34, a rapid change in both mechanical resistance to motion and in electrical resistance is produced, and a corresponding mid-stroke position is determined.

Alternatively, the spring 32 may be formed of the second active material element 26, such as SMP, and communicatively coupled to an activation source (not shown); for example, as part of an ancillary circuit as further described below. The source is communicatively coupled to the load 12 and cooperatively configured therewith to deliver a signal to the spring 32, when the load 12 is at the mid-stroke position. By activating the SMP spring 32, the damping coefficient and therefore stress level within the element 14 is changed. Lastly, it is appreciated that the spring 32 could also be electrically coupled with the controller 24 and the mid-stroke position of the spring 32 determined by the stress, strain, and/or deformation of the coil spring 32.

Figure 5:
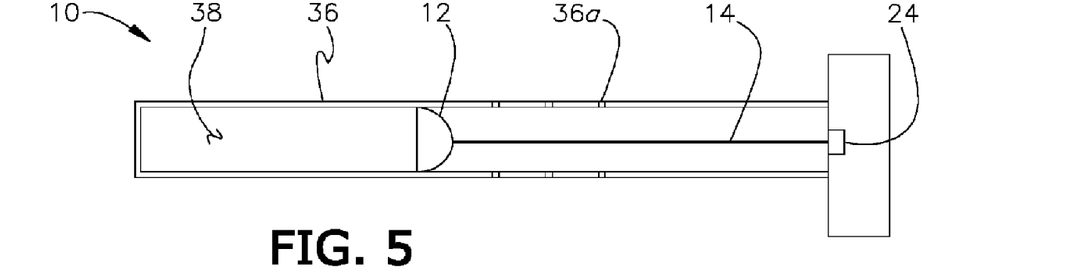
FIG. 5 is a schematic elevation of an actuation system, including an active material element and a portion of a load disposed within a fluid filled sheath, in accordance with a preferred embodiment of the invention.

In another embodiment shown in FIG. 5, both the portion of the load 12 and element 14 are disposed within a sheath 36 filled with a compressible fluid 38 (e.g., air). The load 12 sealably engages the interior surface of the sheath 36, so as to create first and second compartments, and is able to translate therein. Upon activation of the element 14, the load 12 is caused to translate within the sheath 36, so as to reduce the volume of one of the compartments. By doing so, the pressure of the fluid 38 housed therein is increased under Boyle's law; and the mechanical resistance to motion is increased. The sheath 36 defines at least one set of lateral orifices 36a that present a total available outlet size. As the portion of the load 12 translates, and reaches a set of orifices 36a, the mechanical resistance to motion caused by the compression and forcing out of separate quantities of the fluid 38 undergoes a spike. That is to say, at such points, the stress induced within the element 14 will be caused to undergo a rapid change, because of the sudden reduction in the available outlet size. Each set of orifices 36a corresponds to a mid-stroke position to be determined.

Figure 6:
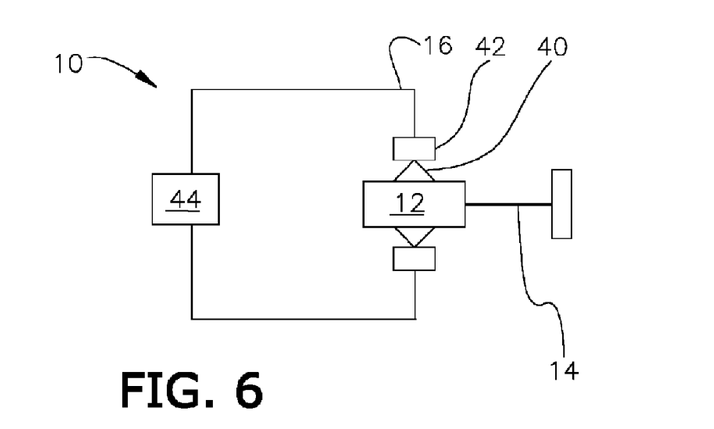
FIG. 6 is a schematic diagram of an actuation system, including an active material element, a portion of a load having conductive leads and drivenly coupled with the element, and a circuit comprising contacts configured to selectively engage the leads, in accordance with a preferred embodiment of the invention.

In the second aspect of the invention, a mid-stroke position is determinable by selectively engaging an ancillary circuit 16 that is positioned adjacent the path with the portion of the load 12 (FIGS. 6-9). In FIG. 6, for example, the portion of the load 12 includes first and second electrical contacts 40, and the ancillary circuit 16 includes first and second leads 42 that are configured and positioned to selectively engage the contacts 40, when the load 12 is at the mid-stroke position. The preferred circuit 16 further includes a monitoring device 44 operable to determine or alert a user to whether the circuit 16 is open or closed. It is appreciated that multiple sets of leads 42 may be used to determine multiple mid-stroke positions, and therefore, that at least one monitoring device 44 may be configured to variably determine and/or alert the user dependent upon the engaged set of leads 42.

Figure 7:
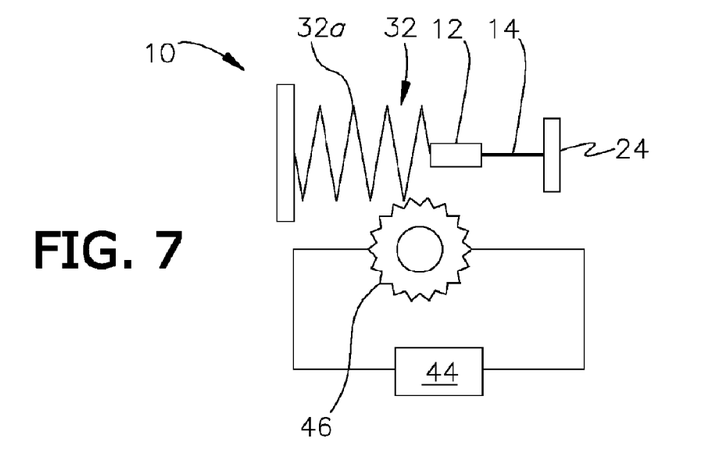
FIG. 7 is a schematic elevation of a system, including an active material element drivenly coupled with a load, a coil spring connected to the load opposite the element, a turning switch positioned so as to selectively engage the coil spring, and a circuit comprising the turning switch, in accordance with a preferred embodiment of the invention.

Another example is shown in FIG. 7, wherein the system 10 is configured similar to the configuration shown in FIG. 4, except that the mechanical resistance wheel 34 is replaced by a turning switch 46 composing the circuit 16. As the switch 46 engages the coils 32a of the spring 32, the circuit 16 is toggled between open and closed conditions, corresponding to mid-stroke positions. Again, by closing the circuit 16, a desirous outcome is achieved that alerts the user to the load achieving the mid-stroke position.

Figure 8:
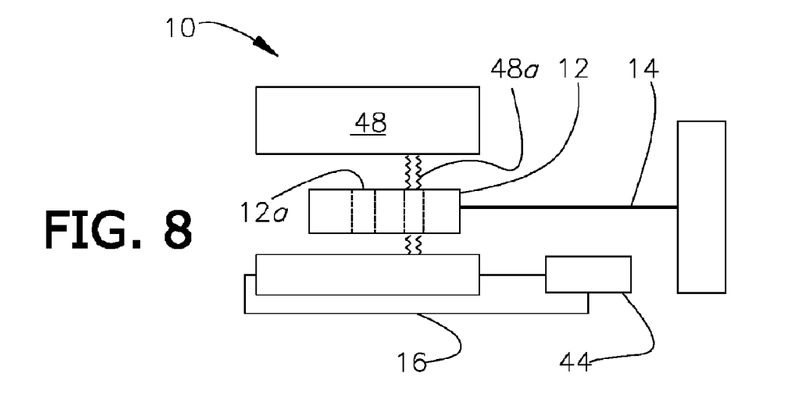
FIG. 8 is a schematic elevation of an actuation system, including an active material element, a portion of a load drivenly coupled with the element, defining a plurality of holes, and a photo-interrupter positioned so as to selectively engage the holes, in accordance with a preferred embodiment of the invention.
Figure 9:
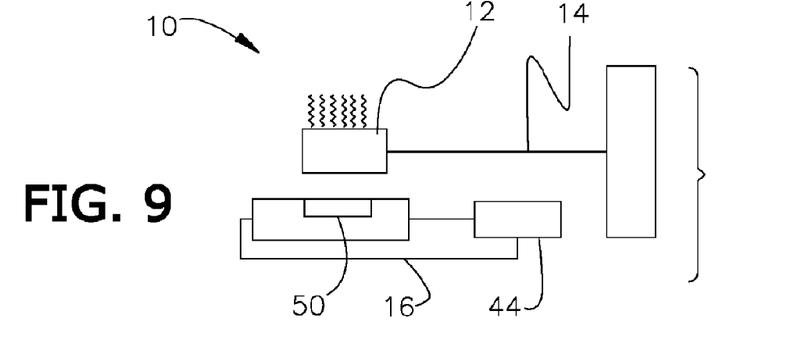
FIG. 9 is a schematic elevation of an actuation system, including an active material element, a portion of a load drivenly coupled with the element, and a photo-transistor positioned along the stroke and shown being occluded from light by the load, in accordance with a preferred embodiment of the invention.

In another example shown in FIG. 8, the portion of a load 12 defines a plurality of holes 12*a* (shown in hidden-line type), and is caused to traverse a photo-interrupter 48 composing the circuit 16, and operable to generate and absorb light or radiation 48*a* generated for example by an infrared LED. More particularly, the portion 12 is configured such that the holes 12*a* are caused to intermittently receive the light 48*a* as the load 12 translates. When the light 48*a* is interrupted, the circuit 16 is open; when the light 48*a* is uninterrupted (i.e., passes through one of the holes 12*a*), the circuit 16 is closed. The hole positions correspond to the pre-determined mid-stroke positions. Since the photo-interrupter 48 is normally closed, it is appreciated that determination of a mid-stroke position may be based on a toggle of the interrupter rather than an absolute condition. As shown in FIG. 9, it is appreciated that the photo-interrupter 48 may be replaced by a photo-transistor 50, which functions similarly but utilizes ambient light. It is appreciated, however, that photo-transistors typically present significantly longer response times.

In plural mid-stroke position embodiments, the controller 24 preferably includes a counter that tracks the number of rapid changes in electrical resistance or modifications to the circuit 16, so as to determine the actual position of the load 12. The counter may count actual rapid changes/circuit modifications, or toggles of the same.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

Suitable algorithms, processing capability, and sensor inputs are well within the skill of those in the art in view of this disclosure. This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A method of determining at least one mid-stroke position of a load driven by an active material element, said method comprising:
    a) drivenly coupling the load with an active material element operable to undergo a reversible change in fundamental property when exposed to or occluded from an activation signal, such that the element is operable to translate the load between first and second positions when the element undergoes the change, so as to define a stroke;
    b) exposing the element to or occluding the element from the activation signal, so as to cause the change;
    c) measuring an electrical resistance of the element throughout the stroke;
    d) inducing or reducing a stress in the element when the load is at said at least one mid-stroke position, so as to cause an increase or decrease in the electrical resistance; and
    e) determining the increase or decrease in electrical resistance.

2. The method as claimed in claim 1, wherein the method further comprises:
    f) altering the activation signal in response to the increase or decrease so as to create a feedback loop.

3. The method as claimed in claim 1, wherein the element is selected from the group of conductive active material elements consisting essentially of shape memory alloys, electroactive polymers, and piezoelectric composites.

4. The method as claimed in claim 1, wherein the mid-stroke positions are relocatable.

5. The method as claimed in claim 1, wherein step d) further includes the steps of inducing or reducing the stress at a plurality of mid-stroke positions, counting the mid-stroke positions, and determining a final position by counting the mid-stroke positions.

6. The method as claimed in claim 1, wherein the load includes a coil spring presenting a selectively modifiable damping coefficient, and step d) further includes the steps of selectively modifying the damping coefficient when the load is at said at least one mid-stroke position, so as to induce or reduce the stress.

7. The method as claimed in claim 1, wherein step d) further includes the steps of physically engaging the load with a fixed member at said at least one mid-stroke position, so as to induce or reduce the stress.

8. The method as claimed in claim 1, wherein step d) further includes engaging the load with a magnetic field, so as to induce or reduce the stress.

9. The method as claimed in claim 8, wherein step d) further includes the steps of selectively magnetizing a non-permanent magnet, so as to produce the field.

10. The method as claimed in claim 1, wherein the load engages a surface during the stroke, and the surface and load cooperatively form at least one detent defining an engaged depth at said at least one mid-stroke position, and the detent induces or reduces the stress.

11. The method as claimed in claim 10, wherein the surface and load are cooperatively configured to define a plurality of detents at a plurality of mid-stroke positions, the mid-stroke positions present absolute locations, and the surface is manipulable so as to alter the plurality of detents, locations, and/or depths.

12. The method as claimed in claim 10, wherein the surface is defined at least in part by a second active material element operable to undergo a second reversible change in fundamental property when exposed to or occluded from a second activation signal, and the second change modifies said at least one detent.

13. The method as claimed in claim 12, wherein the active material element is selected from the group consisting essentially of shape memory polymer, magnetorheological fluid, magnetorheological rubber, and electrorheological fluid.

14. The method as claimed in claim 1, wherein:
at least a portion of the load is sealably and intermediately disposed within a sheath presenting a fixed internal space, and a compressible fluid presenting a first pressure and housed within the space, so as to define first and second compartments having first and second volumes, and bifurcate the fluid; and
step d) further includes the steps of increasing or decreasing the volumes of the compartments when the load translates from the first position to the second position, compressing a portion of the fluid as a result of translating the load, and inducing the stress as a result of compressing the fluid.

15. A method of determining at least one mid-stroke position of a load driven by an active material element, said method comprising:
a) drivenly coupling the load with an active material element operable to undergo a reversible change in fundamental property when exposed to or occluded from an activation signal, such that the element is operable to translate the load between first and second positions as a result of the change, so as to define a stroke having a path;
b) positioning an ancillary circuit relative to the path;
c) exposing the element to or occluding the element from the activation signal, so as to cause the change and translate the load;
d) engaging the circuit with the load at said at least one mid-stroke position;
e) modifying the circuit as a result of engaging the circuit with the load; and
f) determining the modification, so as to identify said at least one mid-stroke position of the load.

16. The method as claimed in claim 15, wherein the circuit comprises first and second leads, and the load includes first and second contacts, and step e) further includes the steps of closing the circuit, by causing the leads and contacts to physically engage.

17. The method as claimed in claim 15, wherein the circuit includes a switch and step e) further includes the steps of toggling the switch, so as to modify the circuit.

18. The method as claimed in claim 17, wherein the switch includes a phototransistor exposed to light, and step e) further includes the steps of the positioned the load intermediate the phototransistor and light, when the load is at said at least one position along the stroke.

19. The method as claimed in claim 17, wherein the switch includes a photo-interrupter emitting a light beam across the path, and step e) further includes the steps of interrupting the beam with the load at said at least one mid-stroke position.

20. The method as claimed in claim 18, wherein the load defines at least one hole and is configured such that the beam encounters one of said at least one hole intermediate adjacent mid-stroke positions, so as to reset the circuit.

\* \* \* \* \*